United States Patent
Liebel

(10) Patent No.: US 8,167,027 B2
(45) Date of Patent: May 1, 2012

(54) PIPE ARRANGEMENT

(75) Inventor: Volker Liebel, Erlangen (DE)

(73) Assignee: Rehau AG. & Co., Rehau (DE)

( * ) Notice: Subject to any disclaimer, the term of this patent is extended or adjusted under 35 U.S.C. 154(b) by 1076 days.

(21) Appl. No.: 12/076,767

(22) Filed: Mar. 21, 2008

(65) Prior Publication Data

US 2008/0236784 A1 Oct. 2, 2008

(30) Foreign Application Priority Data

Mar. 21, 2007 (DE) .................... 20 2007 004 346 U

(51) Int. Cl.
*F24J 3/08* (2006.01)
(52) U.S. Cl. ......................................... 165/45; 165/155
(58) Field of Classification Search .................... 165/45, 165/154, 155, 156
See application file for complete search history.

(56) References Cited

U.S. PATENT DOCUMENTS

| | | | | |
|---|---|---|---|---|
| 5,706,888 A | * | 1/1998 | Ambs et al. .................... | 165/155 |
| 2003/0089413 A1 | * | 5/2003 | Stoffelsma et al. ............ | 138/137 |
| 2004/0103948 A1 | * | 6/2004 | Scheelen et al. ............... | 138/141 |

FOREIGN PATENT DOCUMENTS

| | | |
|---|---|---|
| DE | 20202578 | 5/2003 |
| DE | 20 2004 007 567 U1 | 4/2004 |
| EP | 0582118 | 2/1994 |
| EP | 1 524 108 | 4/2006 |
| WO | WO 2006/100014 | 9/2006 |

OTHER PUBLICATIONS

"Plastics—Determination of environmental stress cracking (ESC) of polyethylene—Full-notch creep test (FNCT)," *International Standard (ISO 16770)*, 1$^{st}$ Ed., Feb. 1, 2004.
German Search Report Dated Mar. 21, 2007 Nov. 15, 2007 Issued in DE 20 2007 004 346.5.

* cited by examiner

*Primary Examiner* — Teresa Walberg
(74) *Attorney, Agent, or Firm* — Venable LLP; Robert Kinberg

(57) ABSTRACT

A pipe arrangement for geothermal probes includes at least two pipes having at least one layer each that surrounds a lumen. One of the pipes functions as inflow pipe and the other pipe functions as return flow pipe. At least one of the pipes is produced at least in part from a non cross-linked polymer material and is distinguished in that the polymer material of the at least one layer for the pipes has a FNCT value (full notched creep test) according to ISO 16770 of at least 3000 hours.

16 Claims, 3 Drawing Sheets

PIPE ARRANGEMENT

BACKGROUND OF THE INVENTION

The invention relates to a pipe arrangement for geothermal probes, comprising at least two pipes having at least one layer surrounding a lumen, wherein one of the pipes functions as inflow pipe and the other pipe functions as backflow pipe and at least one of the pipes is produced at least partially from a non cross-linked polymer material.

Pipe arrangements of this type for geothermal probes are sufficiently well known from the existing prior art. These pipe arrangements are designed to absorb heat from the earth and/or to release heat to the earth.

The German Reference 202004007567 U1, for example, describes a geothermal probe to be installed in a borehole in the ground. This geothermal probe consists of an outer pipe, which forms an outside wall of the probe and is closed at the lower end, as well as an inner pipe extending inside the outer pipe, wherein the annular space between the outer pipe and the inner pipe and the space inside the inner pipe function as lines for a heat transfer medium. The outer pipe in that case is embodied as corrugated pipe, at least over most of its longitudinal extension.

Also known are pipe arrangements for geothermal probes, which consist of pairs of pipes that are provided at the lower end with a connecting elbow and/or a connecting piece. One of the pipes is used as a feed line while the other pipe serves as a return line. However, several such pipe pairs can also be used inside a borehole, which are provided at the lower end with one or several shaped parts as connecting elements.

The European Reference 0582118 A1 furthermore discloses a pipe arrangement consisting of long, parallel-extending plastic pipes that are connected at the lower end. For this, at least one top section is connected by welding or gluing and so as to be liquid-tight to at least two long, straight and parallel pipes, and is furthermore connected via at least one bottom part by welding or gluing to at least one of the straight pipes, so as to be liquid-tight.

A pipe arrangement is finally also known from German Reference 20202578 U1, which consists of pipes made from cross-linked polyethylene.

Furthermore known are pipe arrangements for geothermal probes, for which a pipe section is embodied helical, wherein this helical section can have a constant or changeable diameter.

Also known is the installation of these types of pipe arrangements for geothermal probes inside boreholes and the subsequent filling of these boreholes with material having a high heat-conductivity.

However, to ensure the operation of the pipe arrangement for geothermal probes for a long period of time, especially those made of non cross-linked polymer materials, the pipes can be used only up to specific operating temperatures of approximately 40° C. The non cross-linked materials used until now for pipe arrangements for geothermal probes furthermore have the problem of significant slow crack development, which can lead to a break in the pipe arrangement for geothermal probes during the operation, in particular caused by scoring and/or notching caused resulting from the transport, handling at the construction site, and installation in the borehole.

The non cross-linked pipe arrangements according to prior art of pipes for geothermal probes have the serious disadvantage of not being resistant to concentrated loads. Contrary to the presently held belief, however, it must be assumed that concentrated loads will also act upon the installed pipe arrangements for geothermal probes. In contrast to representations shown in the prior art, the pipe arrangements for geothermal probes are definitely not installed centered inside the borehole and surrounded on all sides by a concrete/bentonite mixture, but always rest at least in part against the wall of the borehole.

Furthermore—again contrary to presently-held believes and representations—it should not be assumed that the borehole wall is smooth, but that it is notched. As a result, concentrated loads will act upon the walls of the pipe arrangement for geothermal probes. Not enough consideration has furthermore been paid so far to the fact that following the installation of the pipe arrangements for geothermal probes inside boreholes, concentrated loads can also be exerted by falling rocks.

Finally, it has not been taken into consideration so far that pipe arrangements for geothermal probes are subjected to considerable alternating loads. Even during the heating operation at the start-up of the heat pump, rapid temperature fluctuations of approximately 10K appear quickly together with the associated heat expansions. These temperature changes can be as high as 40K during the heating and cooling operation. Especially during the continuous operation, these types of loads can result in the forming of cracks on the inside, arranged opposite the concentrated load, of the pipe arrangements for geothermal probes and can continue to grow until they result in a break.

To be sure, pipe arrangements for geothermal probes of cross-linked polymer material are resistant to concentrated loads and do not exhibit slow crack development, but they also have the problem that the butt-welding technique cannot be used when attaching the elements for connecting the pipe pairs. Thus, the production of a pipe arrangement of this type for geothermal probes is material-intensive and cost-intensive.

SUMMARY OF THE INVENTION

Starting with this premise, it is the object of the present invention to overcome the advantages of the known prior art and to provide a pipe arrangement for geothermal probes, which can be produced cost-effectively and economically, which can be installed easily, efficiently and without sustaining damages, and which exhibits a further improved mechanical behavior, especially a balanced ratio between resistance of the pipe arrangement to concentrated loads exerted onto the outside, as well as to cracking or notching on the outside.

The above and other objects are achieved according to the invention with a pipe arrangement as first mentioned above, wherein the polymer material of the at least one layer for the pipes has a FNCT value (full notched creep test) according to ISO 16770 of at least 3000 hours.

Proposed is a pipe arrangement for geothermal probes, composed of at least two pipes that consist of at least one layer surrounding a lumen, wherein one of the pipes forms the inflow pipe and the other pipe forms the backflow pipe and at least one of the pipes is produced at least partially from a non cross-linked polymer material, wherein the polymer material of the at least one layer for the pipes has a FNCT value (full notched creep test) according to ISO[1] 16770 of at least 3000 hours.

[1]International Organization for Standardization

According to one modification, a pipe arrangement for geothermal probes is proposed, which consists of at least two pipes having at least one layer surrounding a lumen, wherein the pipes are provided at one end with at least one connecting element that consists of at least one layer, wherein at least one of the pipes is produced at least partially from a non cross-linked polymer material, and wherein the polymer material of the at least one layer for the pipes and/or the connecting element has a FNCT value (full notched creep test) according to ISO 16770 of at least 3000 hours.

According to a different embodiment of the pipe arrangement according to the invention for geothermal probes, a pipe with a helical shape is proposed. The helical pipe in this case can have a constant or changeable diameter. According to yet another modification of the embodiment according to the invention, the non-helical pipe is provided with heat insulation.

A far-reaching resistance to concentrated loads can thus be achieved with the pipe arrangement according to the invention for geothermal probes, and no slow crack development occurs in the temperature range of up to 20° C., which could result in a failure of the pipe arrangement for geothermal probes over a defined life span of approximately 50 years. A further advantage of the pipe arrangement according to the invention for geothermal probes is seen in the fact that this pipe arrangement can be produced cost-effectively and economically and can be butt-welded to the respective connecting elements. In this way, a pipe arrangement according to the invention for geothermal probes can be provided, which can be produced economically and cost-effectively, but can also be transported and/or installed efficiently without damaging the material for the pipe arrangement for geothermal probes.

A further advantage of the pipe arrangement according to the invention for geothermal probes is seen in the fact that the polymer material of the at least one layer of the pipes and/or the connecting element has a FNCT value (full notched creep test) according to ISO 16770 of at least 5000 hours. This advantageous embodiment of the inventive pipe arrangement for geothermal probes results in a further increase in the resistance to concentrated loads and a clear reduction in the scoring and notching during the continuous operation.

In addition, this embodiment is resistant to concentrated loads at temperatures of up to 40° C., thus ensuring a continued safety of the pipe arrangements for geothermal probes with correspondingly high flow temperatures.

According to a different, but also advantageous embodiment of the pipe arrangement according to the invention for geothermal probes, the polymer material of the at least one layer for the pipes and/or the connecting element has a MRS value (minimum required strength) of at least 10 MPa at 20° C. over a period of 50 years. As a result, pipe arrangements for geothermal probes with a diameter/wall thickness ratio of 11:1 can permanently withstand a pressure of 20 bar.

According to a different embodiment of the pipe arrangement according to the invention for geothermal probes, the polymer material of the at least one layer of the pipes and/or the connecting element has a MRS value (minimum required strength) of at least 12.5 MPa at 20° C. over a period of 50 years. Pipe arrangements according to the invention for geothermal probes can thus advantageously be provided, which ensure a problem-free continuous operation over a service period of approximately 50 years because, wherein these arrangements will not have been subjected to prior damages during the transport or during the installation, especially the installation inside the boreholes.

According to a different but also advantageous embodiment of the pipe arrangement according to the invention, the polymer material of the at least one layer of the pipes and/or the connecting element contains at least one additive that increases the UV resistance, thus making it possible to increase the permissible time periods for open-air storage of the pipe arrangements according to the invention for geothermal probes.

The pipe arrangement according to the invention for geothermal probes furthermore has the advantage that the polymer material of the at least one layer for the pipes and/or the connecting element contains at least one additive and/or reinforcing agent that increases the mechanical resistance.

Thus, by mixing in additives and/or reinforcing agents that are known per se, such as glass fibers, a pipe arrangement according to the invention for geothermal probes can be provided, which can be dimensioned without problem and cost-effectively in accordance with statutory requirements and/or standards.

The pipe arrangement according to the invention for geothermal probes is advantageously designed such that the polymer material of the at least one layer for the pipes and/or the connecting element contains at least one additive that increases the diffusion resistance. These additives can be added in amounts ranging from approximately 1% to 30%, thus making it possible to optimally dimension the mechanical properties of the pipe arrangement according to the invention for geothermal probes.

Furthermore advantageous with the pipe arrangement according to the invention for geothermal probes is that the polymer material of the at least one layer for the pipe and/or the connecting element contains at least one coloring additive that allows marking the inflow pipe and/or the return flow pipe by adding different coloring additives, for example for inventive pipe arrangements for geothermal probes, which can be installed one inside the other.

Another advantage of the pipe arrangement according to the invention for geothermal probes is that the polymer material of the at least one layer for the pipes and/or the connecting element contains at least one additive with antistatic properties, wherein the maximum surface resistance of the pipe and/or the connecting element is $10^{-10}$ Ohm/cm.

The invention furthermore teaches a pipe arrangement for geothermal probes, for which at least one electrically conductive agent is added to the polymer material of the at least one layer of the pipes and/or the connecting element, wherein the surface resistance of the pipes and/or the connecting element is at most $10^{-6}$ Ohm/cm. In general, between approximately 1% and approximately 20% of these additives can be added to the polymer material, as required by law and depending on the dimensioning standards.

Based on the test requirements according to ISO 16770 and taking a first exemplary embodiment at 80° C., 4.0 MPa and containing 2% of the cross-linking agent Arkopal, the FNCT value for the material of the outer layer of the pipe arrangement according to the invention of polyethylene PE 100, according to EN 12201, which has an outside diameter of 110+0.6 mm as well as a wall thickness of 10.0+0.3 mm, is approximately 200 to 750 hours. The FNCT value of the material for the inner layer of the pipe arrangement according to the invention, which consists of a polyethylene with a wall thickness of approximately 1.5 mm, is approximately 3000 hours.

The multi-layer pipe for a different advantageous embodiment is provided with an inside layer of polyethylene, having a wall thickness of approximately 0.7 mm, an FNCT value of approximately 6000 hours, at 80° C., 4.0 MPa and containing 2% of the cross-linking agent Arkopal.

BRIEF DESCRIPTION OF THE DRAWINGS

The pipe arrangement according to the invention for geothermal probes is to be described in further detail with the aid of the following, non-restrictive embodiments.

DETAILED DESCRIPTION

Figure 1:
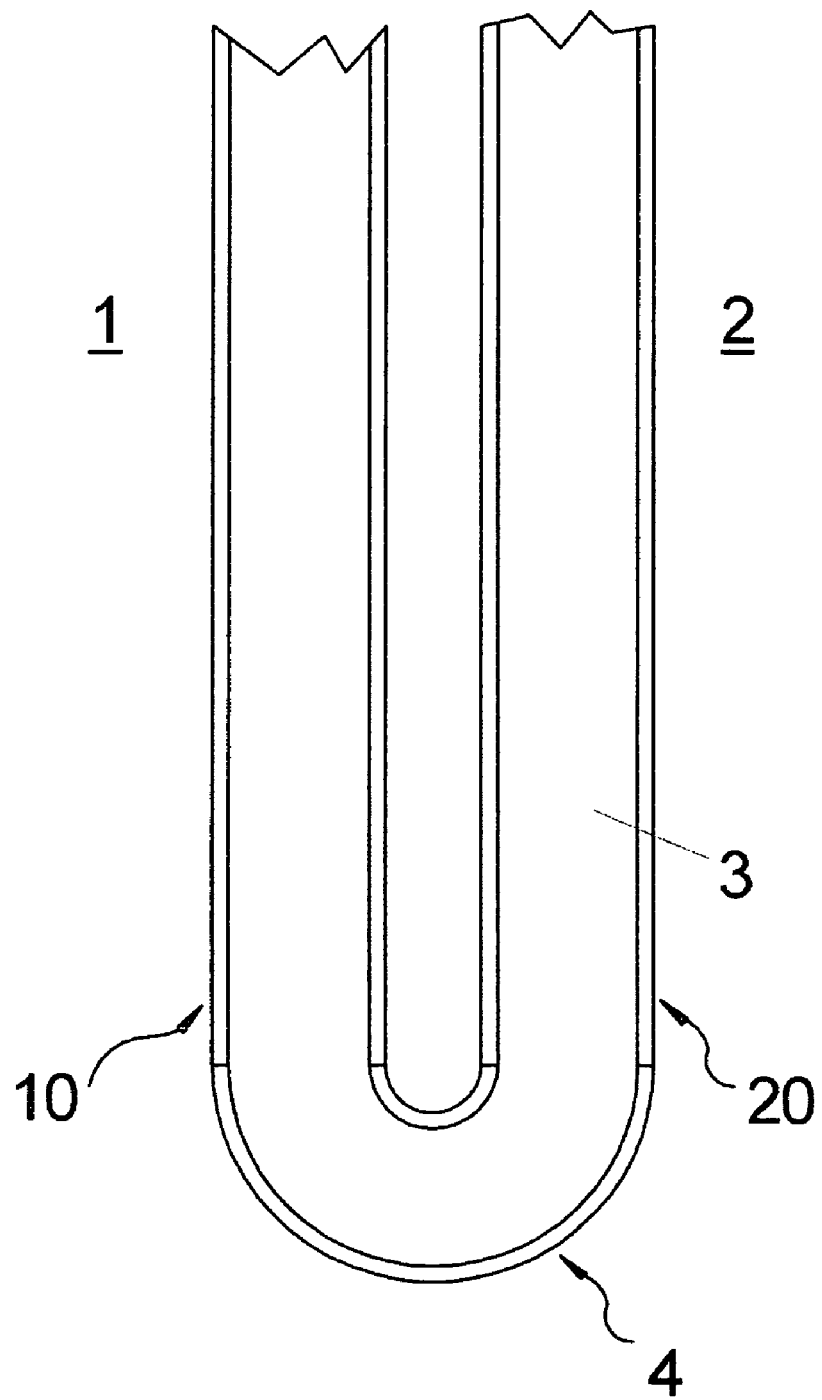
FIG. 1 Shows a schematic sectional representation of a pipe arrangement according to the invention for geothermal probes.

FIG. 1 shows a pipe arrangement according to the invention, consisting of two pipes 1, 2 having at least one a layer surrounding a lumen or inside cavity 3. A connecting element 4 is arranged at the exposed ends 10, 20 of the pipes 1, 2 and is connected liquid-tight to the pipes 1, 2.

The pipes 1, 2 as well as the connecting element 4 are produced from a non cross-linked polymer material, e.g. polyethylene. For this exemplary embodiment, the polymer material of the at least one layer of the pipes 1, 2 and the connecting element 4 has a FNCT value of 3550 hours.

The polymer material of the at least one layer of the pipes 1, 2 and the connecting element 4 is furthermore composed so as to have a MRS value of 11.1 MPa at 20° C. over a period of 50 years.

Figure 2:
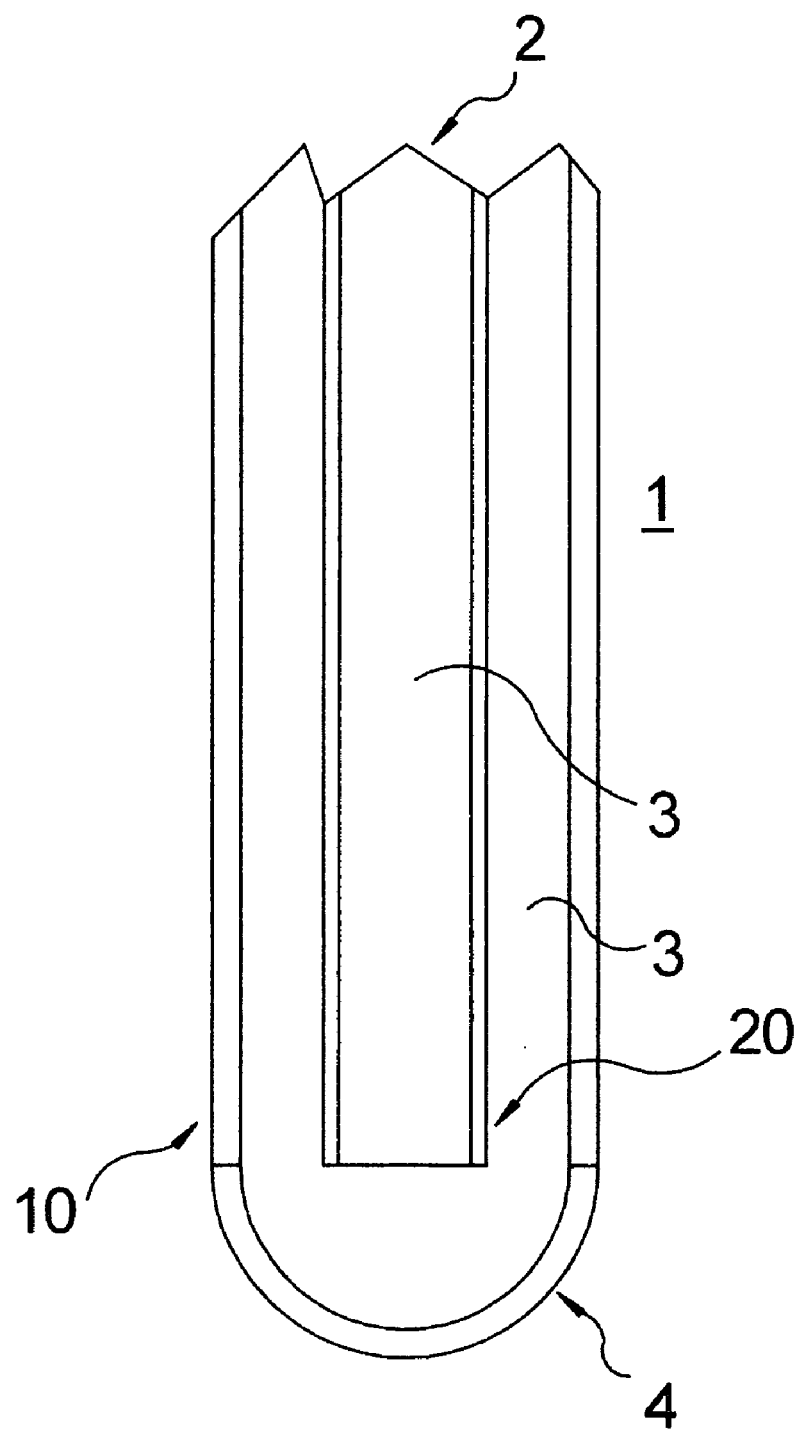
FIG. 2 Shows a schematic sectional representation of a different pipe arrangement according to the invention for geothermal probes.

FIG. 2 illustrates a different schematic representation of a pipe arrangement according to the invention for geothermal probes, consisting of two pipes 1, 2. For this exemplary embodiment, the pipe 2 is inserted concentrically into the lumen 3 of the pipe 1. However, it is within the framework of the invention to insert several pipes 2 into the lumen 3 of the pipe 1, wherein these pipes can be arranged concentric as well as eccentric.

A connecting element 4 is arranged at the exposed end 10 of the pipe 1 and is connected material-to-material, e.g. by welding, as well as liquid-tight to the free end 10 of the pipe 1. The pipe 1 and the pipe 2 have approximately the same length, so that a clearance space is created between the free end 20 of the pipe 2 and the opposite-arranged connecting element 4, through which the liquid flowing through the lumen 3 of the pipe 2 can flow back via the lumen 3 of the pipe 1.

With this exemplary embodiment, the polymer material of the at least one layer of the pipe 1 has a FNCT value of 5550 hours and a MRS value of 13.1 MPa. The polymer material of the at least one layer of the pipe 2 for this embodiment has a FNCT value of 3100 hours and a MRS value of 10.5 MPa at 20° C. over a period of 50 years.

Figure 3:
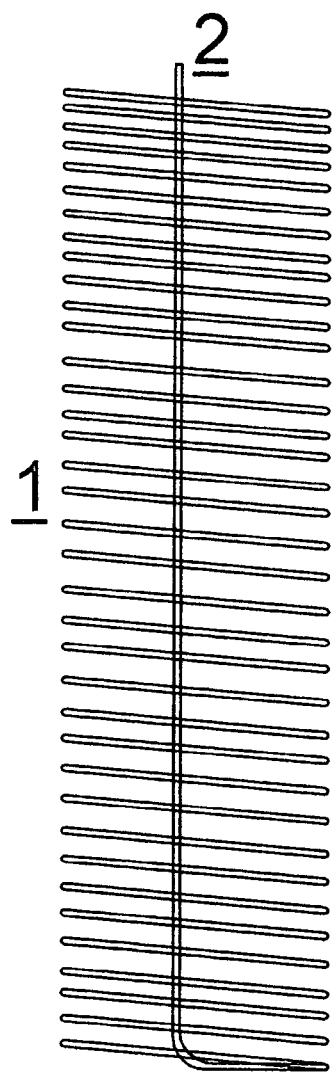
FIG. 3 Shows a schematic view from the side of a partial section through a different pipe arrangement according to the invention for geothermal probes.

With the aid of a different schematic representation, FIG. 3 shows that the pipe 1, which functions as inflow pipe of the pipe arrangement for geothermal probes, has a helical shape, wherein the helical pipe has a constant diameter. The pipe 2 for this embodiment functions as backflow pipe for the arrangement.

Figure 4:
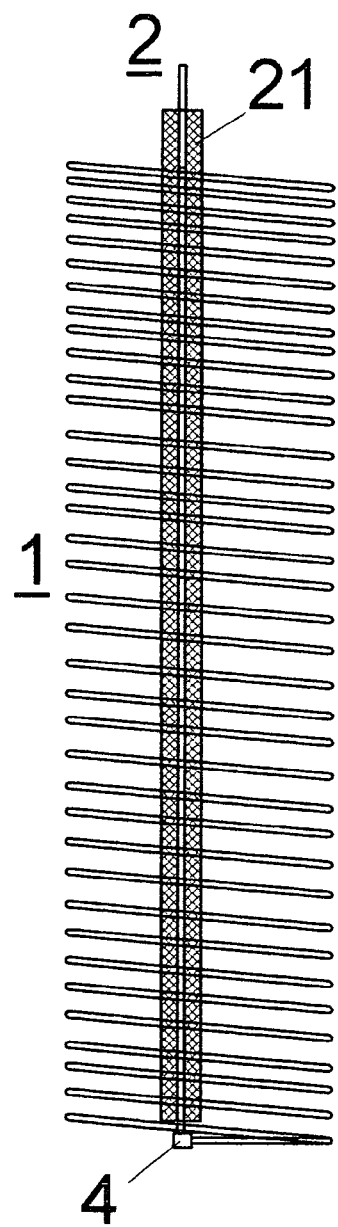
FIG. 4 Shows a schematic view from the side of a partial section through yet another pipe arrangement according to the invention for geothermal probes.

Finally, according to a different schematic representation shown in FIG. 4, the pipe 1 with helical shape is connected via the connecting element 4 to the pipe 2. The pipe 2 functions as backflow pipe for this arrangement. The pipe 2 is provided with heat insulation 21, designed to prevent the loss of heat from the fluid conducted and/or stored in the pipe 2. The heat insulation 21 can consist of a layer of foam or a layer of material, which is designed to reduce heat loss owing to its composition, material selection, type of additives, and the like.

The connecting element 4 of the pipe arrangement according to the invention for geothermal probes can be embodied in many different ways. The teaching according to the invention in particular also comprises means, known per se, for creating a liquid-tight connection between the connecting element 4 and the pipe 1, 2 by using one-part or multi-part connector fittings or welded fittings of optional material types, which can also take the form of a safety sleeve, a sliding sleeve, a snap-in element, an electro-welded bushing or the like.

The teaching according to the invention additionally comprises pipe arrangements for geothermal probes, for which the connecting means 4 are mechanically protected by using additional components such as half shells, or through insert-molding or foam-coating.

The teaching according to the invention furthermore relates to a device for recovering or storing geothermal energy, using a pipe arrangement according to the present invention.

The invention claimed is:

1. A pipe arrangement for geothermal probes, comprising at least two pipes having at least one layer surrounding a lumen, wherein one of the pipes functions as inflow pipe and the other pipe functions as backflow pipe and at least one of the pipes comprises at least partially a non cross-linked polymer material, wherein the polymer material of the at least one layer for the pipes has a FNCT value (full notched creep test) according to ISO 16770 of at least 3000 hours.

2. The pipe arrangement according to claim 1, wherein the pipe arrangement is provided at one end with at least one connecting element having at least one layer wherein the polymer material of the at least one layer for the connecting element has a FNCT value (full notched creep test) according to ISO 16770 of at least 3000 hours.

3. The pipe arrangement according to claim 1, wherein the polymer material of the at least one layer for the pipes has a FNCT value (full notched creep test) according to ISO 16770 of at least 5000 hours.

4. The pipe arrangement according to claim 1, wherein the polymer material of the at least one layer for the pipes has a MRS value (minimum required strength) of at least 10.0 MPa at 20° C. over a period of 50 years.

5. The pipe arrangement according to claim 1, wherein the polymer material of the at least one layer for the pipes has a MRS value (minimum required strength) of at least 12.5 MPa at 20° C. over a period of 50 years.

6. The pipe arrangement according to claim 2, wherein the material of the at least one layer of the connecting element can be connected material-to-material to the at least one pipe layer surrounding the lumen.

7. The pipe arrangement according to claim 2, wherein the material of the at least one layer for the connecting element can be connected frictionally engaged to the material of at least one layer for a pipe that surrounds the lumen.

8. The pipe arrangements in accordance with claim 1, wherein one of the pipes has a helical shape.

9. The pipe arrangement according to claim 8, wherein the helical pipe has a constant diameter.

10. The pipe arrangement according to claim 8, wherein the helical pipe has a changeable diameter.

11. The pipe arrangement according to claim 8, the non-helical pipe is provided with heat insulation (21).

12. A device for recovering or storing geothermal energy, said device comprising a pipe arrangement as defined in claim 1.

13. The pipe arrangement according to claim 2, wherein the polymer material of the connecting element has a FNCT value (full notched creep test) according to ISO 16770 of at least 5000 hours.

14. The pipe arrangement according to claim 2, wherein the polymer material of the connecting element has a MRS value (minimum required strength) of at least 10.0 MPa at 20° C. over a period of 50 years.

15. The pipe arrangement according to claim 2, wherein the polymer material of the connecting element has a MRS value (minimum required strength) of at least 12.5 MPa at 20° C. over a period of 50 years.

16. A device for recovering or storing geothermal energy, said device comprising a pipe arrangement as defined in claim 2.

* * * * *